No. 786,080. PATENTED MAR. 28, 1905.
C. P. WING.
HITCHING STRAP.
APPLICATION FILED OCT. 17, 1903.
2 SHEETS—SHEET 1.
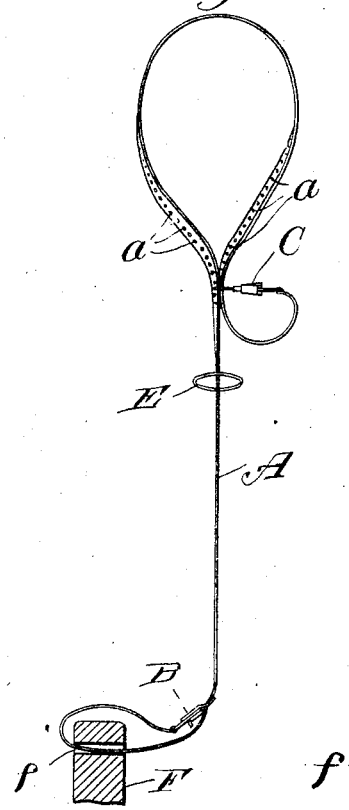
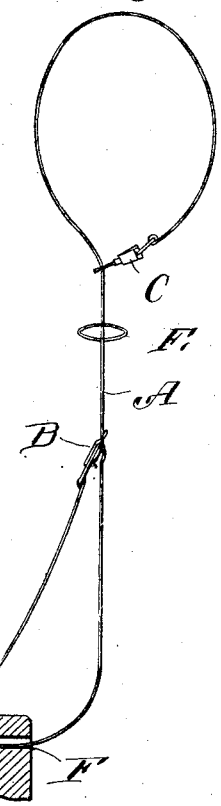
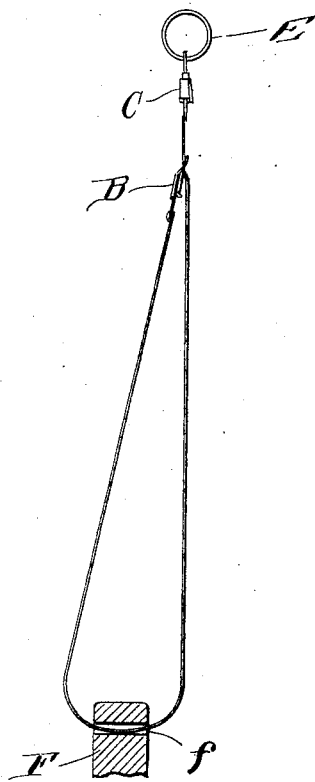
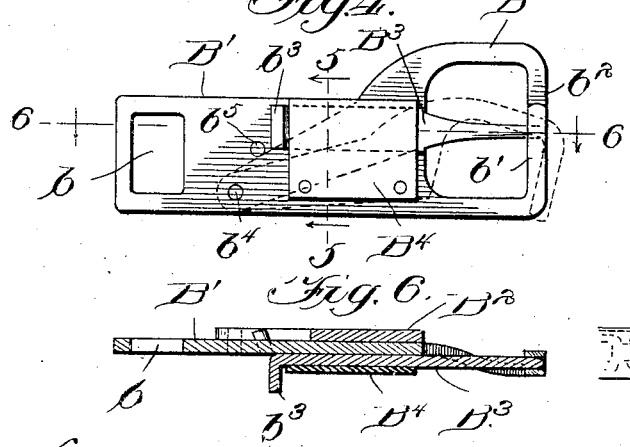
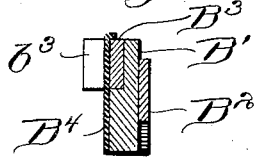
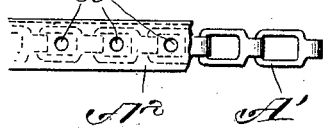
Witnesses:
H. S. Gaither.
C. C. Cunningham.
Inventor:
Charles P. Wing
by Chamberlin & Wilkinson
Attorneys No. 786,080. PATENTED MAR. 28, 1905.
C. P. WING.
HITCHING STRAP.
APPLICATION FILED OCT. 17, 1903.
2 SHEETS—SHEET 2.
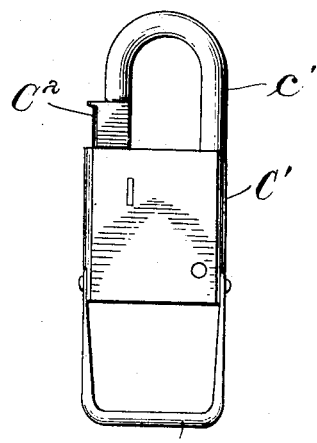
Fig. 8.
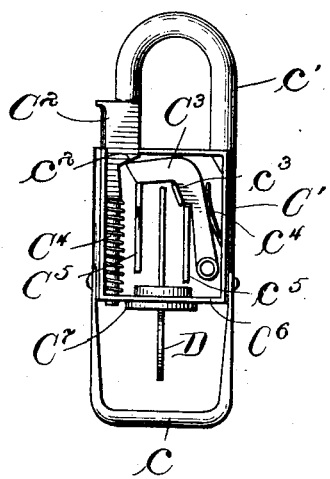
Fig. 9.
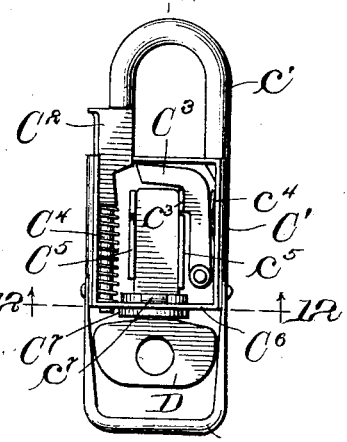
Fig. 10.
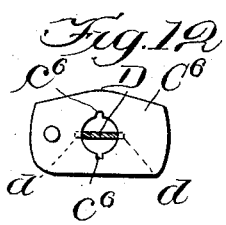
Fig. 12.
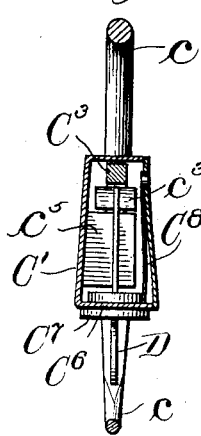
Fig. 11.
Fig. 13.
Fig. 14.
Witnesses:
H. S. Gaither
C. C. Cunningham
Inventor:
Charles P. Wing
by Chamberlin & Wilkinson
Attorneys No. 786,080.  Patented March 28, 1905.

UNITED STATES PATENT OFFICE.

CHARLES P. WING, OF HINSDALE, ILLINOIS.

HITCHING-STRAP.

SPECIFICATION forming part of Letters Patent No. 786,080, dated March 28, 1905.

Application filed October 17, 1903. Serial No. 177,467.

*To all whom it may concern:*

Be it known that I, CHARLES P. WING, a citizen of the United States, residing at Hinsdale, county of Dupage, State of Illinois, have invented a certain new and useful Improvement in Hitching-Straps; and I declare the following to be a full, clear, and exact description of the invention, such as will enable others skilled in the art to which it pertains to make and use the same, reference being had to the accompanying drawings, which form a part of this specification.

My invention relates in general to indestructible straps, and more particularly to a strap for securely hitching animals to a post or other stationary hitching device.

Much inconvenience and annoyance is frequently experienced by the owners of horses owing to the horses being unhitched and ridden or driven off during the absence of the owners, which may readily be done by untying or cutting the usual leather hitching-strap.

The primary object of my invention is therefore to provide a hitching-strap which cannot be either cut or broken or unfastened from the animal or from the hitching-post except by the owner or an authorized person.

A further object of my invention is to provide a hitching-strap which will be simple in construction, comparatively inexpensive in manufacture, and efficient in use.

My invention will be more fully described hereinafter with reference to the accompanying drawings, in which the same is illustrated as embodied in a convenient and practical form, and in which—

Figure 1 is a perspective view of my improvement, showing one method of using the same; Fig. 2, a view similar to Fig. 1, showing another manner of using the invention; Fig. 3, a perspective view showing still a third method of using my improved strap; Fig. 4, a plan view of a collapsible loop or buckle which is adapted to be secured to one end of the strap; Fig. 5, a sectional view on line 5 5, Fig. 4; Fig. 6, a sectional view on line 6 6, Fig. 4; Fig. 7, a detail view of the strap; Fig. 8, an elevational view of a lock adapted to be secured to the opposite end of the strap; Fig. 9, an elevational view showing the interior of the lock; Fig. 10, a view similar to Fig. 9, showing the parts in an adjusted position; Fig. 11, a sectional view on line 11 11, Fig. 10; Fig. 12, a sectional view on line 12 12, Fig. 10; Fig. 13, a plan view of the keyhole-fitting, and Fig. 14 an elevational view of a modified form of loop.

Similar reference characters are used to designate similar parts in the several figures of the drawings.

Reference character A designates the strap, which is preferably composed of a leather covering $A^2$, which surrounds a chain $A'$ or other indestructible flexible reinforcement. Holes $a$ are formed through the leather $A^2$ in registry with the openings in the several links composing the inclosed chain $A'$. The leather covering $A^2$ may be stitched at one or both sides of the chain, or it may be formed of a single strap split through its longitudinal center to receive the chain.

B designates a buckle adapted to be permanently secured to one end of the strap A and preferably partially collapsible to permit the same to be restricted in size sufficiently to pass through the hole $f$ in the hitching-post F or through a ring fastened to a stationary support and at the same time capable of being enlarged so as to permit the passage therethrough of a snap-lock secured to the opposite end of the strap.

The buckle B is provided with an aperture $b$ at one end, by means of which the strap is securely fastened to the buckle. $B^2$ designates a movable part of the buckle pivotally secured at $b^4$ to the main portion $B'$ of the buckle. The ends of the portions $B'$ and $B^2$ of the buckle are inturned and overlap, as shown at $b'$ and $b^2$.

$b^5$ indicates a pin or stop to limit the movement of the portion $B^2$ of the buckle with respect to the portion $B'$.

$B^3$ indicates the tongue of the buckle, which is mounted to slide longitudinally within a groove formed in the portion $B'$ of the buckle.

$B^4$ designates a keeper-plate rigidly secured to the part $B'$ and extending around the channel formed therein, so as to constitute a guideway within which the tongue reciprocates.

$b^3$ indicates a lug at one end of the tongue for actuating the same. The opposite end of the tongue is tapered and is adapted to engage registering semicircular openings formed in the overlapped ends $b'$ and $b^2$ of the two portions of the buckle.

Any suitable form of snap-lock or other fastening device is securely attached to the end of the strap opposite to that to which the buckle B is secured. I have shown a preferred form of snap-lock, which consists in a casing $C'$, provided with a fixed bow $c'$, which terminates at its free inturned end a short distance from the casing.

$C^2$ indicates a bolt mounted to reciprocate within the casing $C'$ and to close the space between the same and the inturned end of the bow $c'$.

$C^4$ indicates a spring tending to project the bolt $C^2$ outwardly into contact with the end of the bow.

$C^3$ designates a pawl pivotally mounted within the casing $C'$ and adapted to engage beneath a shoulder $c^2$ on the bolt $C^2$.

$c^4$ indicates a leaf-spring interposed between the casing and the pawl and tending to rock the pawl into position to engage beneath the shoulder on the bolt, as clearly shown in Fig. 9.

$c^3$ designates a bearing-plate secured to the inner edge of the pawl and adapted to extend above the guide-plate $c^5$. A second guide-plate $C^5$ is provided, between which and the guide-plate $c^5$ a key D is adapted to be inserted.

$C^7$ designates a suitable keyhole-fitting rotatably mounted in the lower wall $C^6$ of the casing $C'$. In order that the key may be retained in the lock when the pawl is disengaged from the bolt, diametrical notches $c^6$ are formed in the lower wall of the casing, which permit the key to be inserted and removed from the lock when in the position shown in Fig. 9, but which prevent the removal of the key when it is turned to the position shown in Fig. 10.

$d$ designates notches formed in the key and which receive the portions of the edge of the keyhole in the bottom plate $C^6$ of the casing, as clearly shown in Fig. 12, and serve to retain the key within the lock.

My improved hitching-strap may be conveniently used in the following manner: The buckle B having been firmly fastened to one end of the strap by means of the hole $b$ therein and the snap-lock C having been firmly secured to the opposite end of the chain by means of the yoke $c$, pivotally secured to the lower end thereof, the strap is ready for use. When the hole or ring in the hitching-post is of such a size as to prevent the buckle B when in its distended condition (shown in full lines in Fig. 4) from passing therethrough, the tongue is withdrawn from engagement with the overlapped ends $b'$ and $b^2$, thereby permitting the portion $B^2$ to be swung into the position shown in dotted lines in Fig. 4, thereby decreasing the width of the buckle and permitting it to pass through a restricted hole $f$, formed through the hitching-post F. The loop is then distended by swinging the part $B^2$ into position shown in full lines in Fig. 4, so as to permit the passage therethrough of the snap-lock C. The lock C may then be passed through the bit-ring and around the neck of the animal, when the bow of the lock is passed through a hole $a$ in the strap, or, if preferred, as shown in Fig. 1, it may be passed through two holes in the hitching-strap. Preparatory to engaging the lock with the holes in the hitching-strap the key D is turned to the position shown in Fig. 11, thereby removing the pawl $C^3$ from beneath the shoulder of the bolt $C^2$, so as to permit the latter to be moved inwardly against the tension of the spring $C^4$, so as to open the space between the end of the lock-casing and the inturned end of the bow, after which the bow may be readily inserted through one or more holes in the strap. The key D is then given a quarter-turn—namely, to the position shown in Fig. 9—which permits the spring $C^4$ to swing the pawl beneath the shoulder on the bolt, thereby securely retaining the bow locked through the holes in the strap. The key may then be removed and the animal cannot be unfastened except by the use of the key. After the strap has been fastened around the neck of the animal the length thereof may be suitably adjusted by moving the buckle B over the strap to any desired point, as shown in Fig. 1 or Fig. 2, when the tongue $B^3$ is moved outwardly and caused to pass through the hole in the strap and into engagement with the semicircular recesses formed in the overlapped ends of the buckle, thereby securely retaining the strap at the desired length.

If desired, the strap need not be passed around the neck of the animal, but may be directly secured to the bit-ring E by passing the bow of the lock around the same and then locking the bolt, as shown in Fig. 3.

When it is desired to unfasten the animal, the key is inserted in the lock and given a quarter-turn—namely, from the position shown in Fig. 9 to that shown in Fig. 10—which, through the engagement of the upper end of the key with the bearing-plate $c^3$ on the pawl $C^3$, oscillates the latter out of engagement with the shoulder on the bolt, which may then be depressed and the bow disengaged from the holes in the strap. The tongue on the buckle is then withdrawn from engagement with a hole in the strap and the strap and lock then passed through the buckle, after which the latter may be partially collapsed and passed through the restricted hole in the hitching-post, thereby entirely disengaging the hitching-strap from the post and from the animal. After turning the key to the position shown in Fig. 10 it is allowed to remain in the lock and cannot be removed therefrom when in such position, owing to the engagement of the notches $d$ thereon with the wall of the keyhole between the notches $c^6$, the key being held in such position by means of the leaf-spring $C^8$ bearing against one of the flat portions $c^7$ on the periphery of the keyhole-fitting $C^7$. (See in particular Figs. 11 and 13.) In other words, the flat portions $c^7$ on the key-fitting $C^7$ are so located with respect to the spring $C^8$ and the notches $c^6$ that when the key is turned, and with it the fitting, to the position shown in Figs. 10 and 11 the lower end of the leaf-spring $C^8$ engages one of the flat faces $c^7$ and retains the key in the position shown in Fig. 10 with respect to the notches $c^6$, thereby preventing the key becoming disengaged from the lock, rendering it possible to utilize the snap-lock as an ordinary snap-hook by merely depressing the bolt $C^2$.

As a modified form of loop to be used in lieu of the loop consisting in the collapsible buckle above described a loop consisting in a wire device composed of two hinged portions, such as shown in Fig. 14, may be employed, such device comprising a portion G, having a loop $g$, to which the hitching-strap may be permanently secured. The outer end of the portion G is bent to form an eye $g^2$, while its opposite end $g'$ is bent around the adjacent portion of the wire.

G' designates a movable portion secured to the portion G by means of an eye $g^4$ at one end engaging the eye $g^2$ and by means of an eye $g^3$, surrounding the wire adjacent to the eye $g'$. It is obvious that the portion G' may be swung backwardly upon the part G, so as to diminish the width of the device to permit the same to be passed through a hole in the hitching-post and subsequently expanded to permit the passage therethrough of the lock.

From the foregoing description it will be observed that I have invented an improved hitching-strap by means of which an animal may be securely fastened to a hitching-post or other stationary device, so as to prevent the untying of the animal by any one except the owner and which is practically indestructible, thereby preventing an unauthorized person from breaking or cutting the strap and taking away the animal.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In a device of the character described, the combination with a flexible strap comprising a covering and an inclosed reinforcement, an expansible metallic loop composed of two hinged portions fastened to one end of said strap through which the strap is adapted to pass, and a lock secured to the opposite end of said strap adapted to pass through said loop when the latter is expanded.

2. In a device of the character described, the combination with a flexible strap comprising a covering and an inclosed reinforcement, said covering and reinforcement having registering holes therethrough, a metallic loop composed of two relatively movable parts secured to one end of said strap through which the strap is adapted to pass, a reciprocating tongue mounted upon said loop and adapted to pass through one of said holes in the strap into engagement with and thereby lock the two parts of the loop against relative movement.

3. In a device of the character described, the combination with a flexible strap comprising a covering and an inclosed reinforcement, said covering and reinforcement having registering holes therethrough, a lock secured to one end of said strap the bow of which is adapted to pass through one or more of the holes in said strap, and an expansible metallic loop secured to the other end of said strap through which said lock is adapted to pass.

4. In a device of the character described, the combination with a flexible strap comprising a covering and an inclosed reinforcement, said covering and reinforcement having registering holes therethrough, an expansible metallic loop secured to one end of said strap through which the strap is adapted to pass, a reciprocating tongue mounted upon said loop and adapted to pass through one of said holes in the strap, a lock fastened to the opposite end of said strap from said loop and adapted to pass through said loop when expanded, the bow of said lock adapted to pass through one or more of the holes in said strap.

5. In a device of the character described, the combination with a strap, of a metallic collapsible loop composed of two hinged portions secured to one end of said strap through which when expanded the strap is adapted to pass and when contracted adapted to pass through the aperture in a stationary hitching device.

6. In a device of the character described, the combination with a strap having holes therethrough, of a two-part collapsible metallic loop secured to one end of said strap through which the strap is adapted to pass, and a reciprocating tongue mounted upon said loop adapted to engage said holes through the strap into engagement with and thereby lock the two parts of the loop against relative movement.

7. In a device of the character described, the combination with a strap having holes therethrough, of a collapsible loop having overlapping relatively movable parts between which the strap is adapted to pass, and a reciprocating tongue mounted upon said loop adapted to engage and relatively lock the movable parts of said loop.

8. The combination with a hitching-strap, of a stationary hitching device, a metallic loop composed of two hinged parts secured to said strap through which the strap is adapted to pass, whereby the loop may be restricted in width to pass through the stationary hitching device, and expanded in width to permit the passage therethrough of the strap.

9. The combination with a hitching-strap composed of a covering, and an inclosed reinforcement, a snap-lock secured to one end of said strap, a metallic loop composed of two hinged parts secured to the other end of said strap, whereby the loop may be restricted in width to pass through a hitching device and expanded in width to permit the passage therethrough of said lock.

In testimony whereof I sign this specification in the presence of two witnesses.

CHARLES P. WING.

Witnesses:
 GEO. L. WILKINSON,
 C. C. CUNNINGHAM.